Sept. 26, 1939.　　K. SCHMID ET AL　　2,173,918
MULTIPLE BEAM RADIO BEACON
Filed Aug. 17, 1936　　2 Sheets-Sheet 1

VALUES OF INITIAL D.C. COMPONENTS AS OBTAINED BY ADJUSTMENT OF POTENTIOMETER 27

INVENTORS
KURT SCHMID
WILHELM RUNGE AND
BY WALDEMAR ILBERG
ATTORNEY

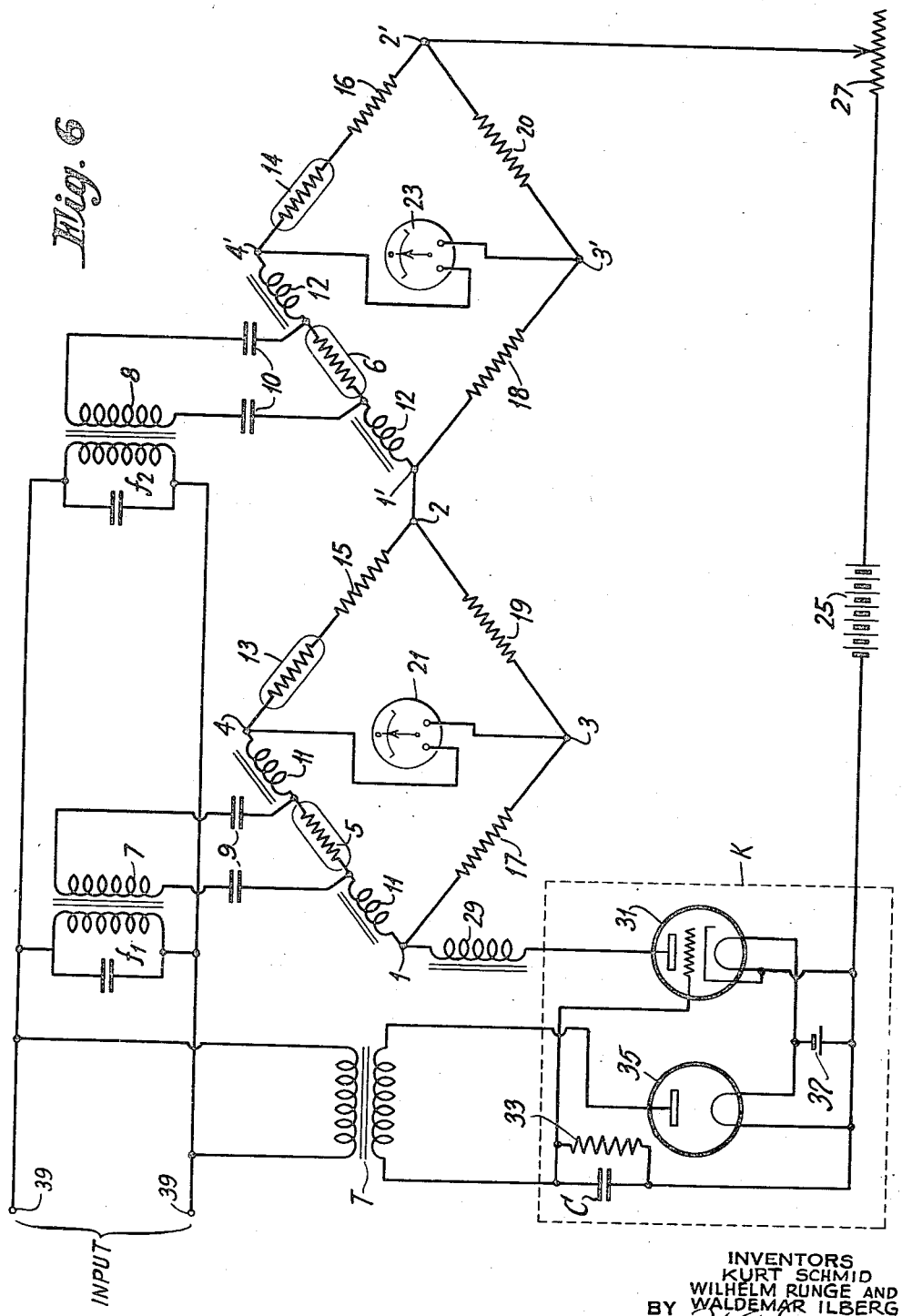

Patented Sept. 26, 1939

2,173,918

UNITED STATES PATENT OFFICE 2,173,918

MULTIPLE BEAM RADIO BEACON

Kurt Schmid, Waldemar Ilberg and Wilhelm Runge, Berlin, Germany, assignors to Telefunken Gesellschaft für Drahtlose Telegraphie m. b. H., Berlin, Germany, a corporation of Germany Application August 17, 1936, Serial No. 96,520
In Germany August 16, 1935

4 Claims. (Cl. 250—11)

(Granted under the provisions of sec. 14, act of
March 2, 1927; 357 O. G. 5)

This invention relates to radio beacon systems of the multiple directive beam type. It has for its object to provide suitable arrangements whereby the directive signals as received may be caused to actuate simultaneously a plurality of instrument pointers for denoting whether or not the craft is following a prescribed course.

A further object of the invention is to provide a novel form of damping means to avoid "quiver" of the instrument pointers.

Figure 1:
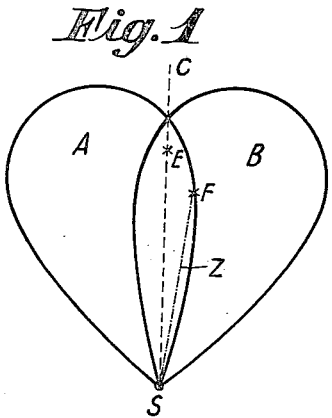
Figure 2:
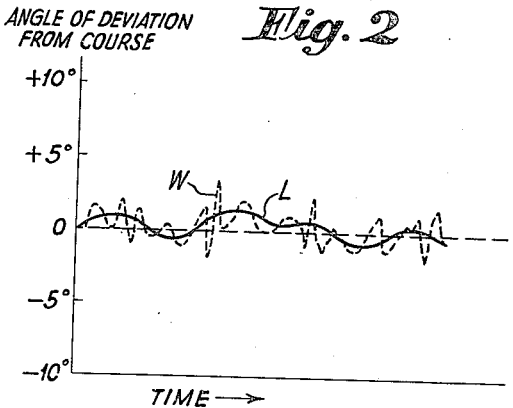
Figure 3:
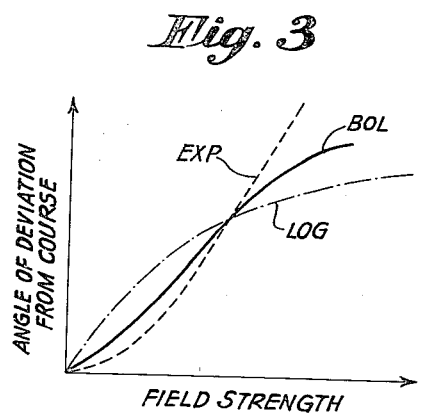
Figure 4:
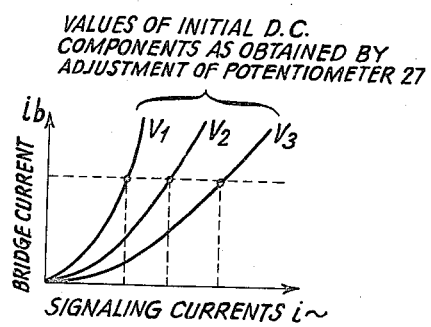
Figure 5:
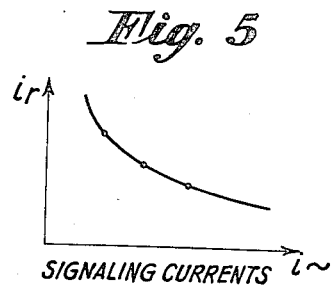

The invention will be described in detail in the following part of the specification, reference being made to the accompanying drawings in which:

Fig. 1 shows a map of the directional beams to be used in the beacon system,

Fig. 2 shows a curve of conventional instrument pointer "quiverings" which are to be smoothed out by the use of the invention, a smooth curve being also shown by way of comparison, Fig. 3 shows diagrammatically certain detector characteristics with and without the use of a bolometer, Figs. 4 and 5 are diagrams which are referred to in explaining the theory of operation of the invention, and Fig. 6 is a circuit diagram of receiving apparatus suitable for carrying out the invention.

A great many methods have been proposed to guide vehicles along a straight course by means of electromagnetic waves. The course is defined by means of directed beams. According to Fig. 1, two beams of rays A and B are sent out in a known manner. They are rendered distinct from each other either by means of keying or by different modulation frequencies. The line of equal field strength of both radiations characterizes the course CS. The course indication may be recognized, for instance, through a steady note, where two transmitters located at S are keyed in the rhythm of complementary Morse signals. If the two beams of rays are modulated by different notes, then along the course CS the volumes of the two notes are the same, while at lateral deviation, the volumes differ from each other to a greater or lesser degree. Since, the comparison of volume of two notes involves difficulties when carried out by ear, the modulation notes are preferably detected in the receiver and the volumes are measured as voltage or current variations in indicating instruments. Two instruments are sometimes combined as a double pointer instrument, so that both pointers move on a single scale. The direct potentials obtained from the two notes are applied in opposition to an instrument whereby the same volumes of both notes are indicated by the zero deviation of the instrument. In practice, the carrying out of this guide ray method involves considerable difficulties. If, for instance, a receiver is situated on the guide line at the point E of Fig. 1, both pointers of the double pointer instrument will ordinarily have the same deviation, such as shown by the base line marked "O" in Fig. 2. Assuming that the aircraft occupies a position F (Fig. 1) then the energy of beam B will be stronger than that of beam A. Owing to interference phenomena and the like, the pointers of the indicating instrument at the receiver no longer remain immovable, but are subjected to lateral deviations in the form of irregular "quiverings" as illustrated by the line W along the time axis of Fig. 2, thus preventing an exact reading.

In accordance with the invention, this drawback is avoided in that a certain inertia is imparted to the moving elements of the indicating instrument.

The instrument pointer no longer responds to the irregular impulses, but assumes a position corresponding to the mean value of the applied forces. In other words, the instrument pointer readings show the actual departure of the aircraft from its course, as shown by the smooth curve L in Fig. 2.

The inertia of the indicating instruments can be obtained in various ways. On first thought, it would seem that the inertia could be imparted to the indicating instruments by mechanical damping means, or by using a hot wire instrument. While a measure of success is so attained, we have found it more satisfactory to obtain inertia in the detectors, and for this purpose we prefer to use thermo-elements or bolometers.

According to the prior art an indicating device has been used for each of the modulation notes, each instrument showing the drop of potential across a thermo-element. This arrangement has sufficient inertia, but it has the disadvantage that thermo-elements burn out easily when overloaded. The indicating instruments for the herein described guide ray system have a very steep detection characteristic, for instance, an exponential characteristic, such as represented in Fig. 3 by the dotted line curve EXP. Hereby, however, the indication of the deviation from the guide ray varies in different degrees according to whether the receiver is near or far from the transmitter. Therefore, in order to obtain instrument readings which are consistently in agreement with the angle of deviation from the guide ray, a very efficient volume control must be provided.

In accordance with the invention, the detector is preferably arranged to have a quasi-logarithmic characteristic, the curve of which conforms as closely as possible to that which is designated LOG in Fig. 3. The characteristic of a bolometer is very similar to the desired curve and, therefore, meets the requirements as shown by the curve BOL in Fig. 3.

The functioning of a bolometer is approximately as follows:

A fine wire usually situated within an evacuated glass vessel changes its resistance with the temperature. Thus if current is passed through a bolometer wire, the change in its resistance is a measure for the intensity of the current. A circuit arrangement having bolometers therein is shown in Fig. 6. The bolometer 5 for one of the modulation frequencies is coupled across coil 7 to a selective portion $f_1$ of the input circuit. The condensers 9 serve for the blocking of direct current and give free passage to the alternating current. The bolometer is located in one leg of a Wheatstone bridge circuit the four corner terminals of which are designated 1, 2, 3, and 4, respectively. The two chokes 11 serve for blocking the flow of alternating current into other portions of the bridge.

Between the terminals 2 and 4 are located another bolometer 13 and a resistor 15 for balancing the resistive impedances in the leg 1—4. The leg 1—3 contains a resistance 17 equal to the resistance 19 in the leg 2—3. The instrument 21 is preferably a galvanometer having a mid-position of its scale for indicating no current. This instrument is connected across the normally equi-potential points 3 and 4.

The bridge and other circuit arrangements so far described in connection with the tuned circuit $f_1$ are substantially duplicated, as shown in Fig. 6, in respect to another portion $f_2$ of the input circuit, in order that separate indications may be made of the signal amplitudes in relation to the two beams A and B. Elements in the duplicate arrangement have been given "even" reference numbers, in each case one number higher than the "odd" reference numbers of the above described bridge circuit, except that the terminals 1', 2', 3' and 4' in the second bridge correspond respectively with terminals 1, 2, 3 and 4 in the first bridge.

A source of direct current potential 25 is arranged to fed both bridges in series and by way of an adjustable resistor 27 so that the normal current flow may be regulated to a desired amplitude. This source also supplies anode potential through the bridges and through a choke 29 to the anode of an electron discharge tube 31. This tube is here illustrated as a triode having an indirectly heated cathode connected to one terminal of a resistor 33, and having a control electrode connected to the other terminal of the same resistor.

The resistor 33 and the secondary winding of transformer T are series-connected between the anode and the cathode of a detector tube 35. The resistor 33 is preferably shunted by a condenser C in order to provide a high frequency path across its terminals. The filaments of both tubes 31 and 35 are heated by a source 37, one terminal of which connects with the negative pole of the source 25.

Within the broken line enclosure K is a combination of elements (including certain of those already described) useful as an automatic volume control device in connection with the bolometer circuit arrangements. The purpose of the volume control is to make the instrument readings truly indicative of angular departures of the craft from the established cource CS. The result obtained is one wherein the distance of the receiver from the transmitter has little or no influence upon the deviations of the instrument pointers. The operation of the system is as follows:

The incoming signals of the two beams A and B and having modulation frequencies $f_1$ and $f_2$, respectively, are impressed across the terminals 39, and through the resonant networks $f_1$ and $f_2$. A portion of the energy of either or both frequencies is shunted through the transformer T for operating the automatic volume control device.

Depending upon the amplitudes of the signals of the respective frequencies, the bolometer 5 in the one bridge and the bolometer 6 in the other bridge will be more or less heated by the alternating signaling currents. The equilibrium of each bridge will thereupon be disturbed in dependence upon the frequency component to which it is responsive. The departure from equilibrium is directly measured by the instruments 21 and 23, since these instruments are so connected across normally equi-potential points of the bridges that they must respond to a change in the resistive value of the bolometers 5 and 6 when the latter become heated. The instruments would respond further to variations in the direct current components in the respective legs of the bridge, but only insofar as such variations are the result of unbalancing the bridges.

Now since the resistance value of the bolometer 5 is partly dependent upon variations in the D. C. component, it is essential that an equivalent bolometer 13 be inserted in the opposite leg of the bridge. Thus, for different values $v_1$, $v_2$, etc. of the D. C. components, both bolometers are varied in the same sense and the equilibrium of the bridge is rendered constant except in response to variations in the signaling currents.

The relationships between the effects of the alternating component $i_\sim$ and the direct current variations $i_b$ through the bridge are illustrated in Fig. 4, where different values $V_1$, $V_2$ and $V_3$ are assigned to the initial D. C. components.

In order to obtain equal bridge currents $i_b$ at different alternating currents $i_\sim$, different initial heating currents $V_1$ to $V_3$ are required. Hence by varying the current V it is possible to maintain constant the bridge current $i_b$ and hence the deviation of 21 at different alternating currents $i_\sim$, i. e. at different volumes of the modulation notes. Thus a manual volume control 27 may be used for varying the pre-heating current $i_v$. Fig. 5 shows the relationship between the initial heating current V and the signaling current $i_\sim$ at constant bridge current $i_b$.

The automatic volume control device K operates as follows:

A portion of the signaling energy of either modulation frequency $f_1$ or $f_2$, or both, is impressed on the primary of the transformer T and the resultant secondary current is fed through the resistor 33 and rectified by the diode tube 35. The amplitude of this rectified current varies the potential drop across the resistor 33, and hence, the bias on the control grid of the tube 31 is correspondingly varied.

Since the value of the initial heating current in the bridges is dependent upon the over-all resistive impedance of the direct current path externally of the source 25, it follows that the control of impedance value of the tube 31 in this direct current path is just what is needed for obtaining proper volume regulation.

The greater the strength of the incoming signals, the more negatively biased will the grid of the tube 31 become. Hence, the initial value of the D. C. heating current through the bolometers will be correspondingly reduced. This action renders the instruments 21 and 23 independent of variations in the mean value of the signal amplitudes and responsive only to differences between the respective values of the individual modulation frequencies.

The bolometers themselves possess sufficient time lag in their response so as not to cause meaningless waverings of the instrument pointers. The automatic volume control device applied to the bolometer circuits also performs its function in the advantageous manner already set forth.

It is apparent that various modifications may be made without departing from the spirit of the invention. For example, other types of discharge tubes may be substituted for those shown at 31 and 35, or in place of the tube 35 a dry rectifier may be used to advantage.

Moreover the arrangement may be used for obtaining simultaneous and comparative indications in respect to the modulation frequencies corresponding to each of a plurality of directive beams greater than two.

We claim:

1. In a receiving system for enabling a craft to follow a given course as defined by directed radiant energy, a Wheatstone bridge arrangement having a bolometer disposed in one of the legs thereof, an equivalent bolometer disposed in another leg serially connected with the first mentioned leg, a pair of equivalent impedances each located in one of the remaining legs respectively, a source of direct current impressed across the serially connected bolometers and also across the two legs containing the pair of equivalent impedances, means for impressing signaling energy across one only of said bolometers, means including an automatic volume control device responsive to variations in the amplitude of the received signalling energy for regulating the flow of direct current through said bridge, and an indicating instrument connected across normally equi-potential points on said bridge.

2. In a course finding system, a pair of serially connected Wheatstone bridge circuits, a source of direct current potential having one terminal connected to said circuits, an electron discharge tube having its space path connected between the Wheatstone bridge circuits and said source thereby to form a closed circuit, resistive impedances in each leg of each bridge circuit, four of said impedances being of the type such that the ohmic value thereof varies substantially with thermal changes therein, indicating instruments connected across normally equi-potential points of said bridges, one instrument for each bridge, an input circuit receptive of directional signals having distinguishable modulations, means for impressing said signals selectively on different ones of said thermally variable impedances in respectively different bridge circuits, thereby to produce departures from equilibrium in said bridges such as to be indicated by said instruments, and means responsive to variations in amplitude of said signals for correspondingly varying the impedance value of said discharge tube.

3. In a radio receiving system, a Wheatstone bridge arrangement having equivalent fixed resistors serially connected in two of the branches and temperature-dependent resistors serially connected in the two remaining branches, a source of direct current potential applied across the fixed resistors in parallel with the temperature-dependent resistors, an indicating instrument of the galvanometer type connected across normally equi-potential points of said bridge arrangement, one of said points being between the fixed resistors, and the other point being between the temperature-dependent resistors, a frequency selective circuit on which to impress received high frequency energy, an alternating current circuit coupled to said frequency-selective circuit and including one only of said temperature-dependent resistors in series with a blocking condenser, means for preventing the dissipation of high frequency energy into bridge branches other than the one whose temperature-dependent resistor is under the influence of the frequency selective circuit, and an automatic volume control means connected between one of the terminals of said direct current potential source and a bridge terminal common to two of the parallel-connected branches, said automatic volume control means being responsive to incoming high frequency energy for rendering said indicating instrument relatively insensitive to amplitude variations in said high frequency energy and super-sensitive to variations in the energy to which said frequency selective circuit is responsive.

4. In a radio receiving system of the type which employs a tandem Wheatstone bridge arrangement having fixed resistors serially connected in four of its branches and temperature-dependent resistors serially connected in the four remaining branches, the method of comparing the relative strengths of radiant energy components of two different predominating frequencies which includes the steps of segregating the energy component of each frequency and applying the same across an appropriate one of said temperature-dependent resistances, separately measuring the degree of unbalance produced across normally equi-potential points of said Wheatstone bridge arrangement due to the heating effects of said components upon two of said temperature-dependent resistances, compensating for variations in the flow of a direct current through said Wheatstone bridge arrangement by equalizing the effects thereof on all four of said temperature-dependent resistances, and applying an automatic volume control influence to the direct current flow through said Wheatstone bridge arrangement in response to amplitude variations in the total of said radiant energy components, thereby to render said unbalance measurements relatively insensitive to such amplitude variations.

KURT SCHMID.
WALDEMAR ILBERG.
WILHELM RUNGE.